US008538647B2

(12) United States Patent
Sahashi et al.

(10) Patent No.: US 8,538,647 B2
(45) Date of Patent: Sep. 17, 2013

(54) CONTROL APPARATUS FOR AUTOMATIC TRANSMISSION AND CONTROL METHOD THEREOF (75) Inventors: Tatsuya Sahashi, Anjo (JP); Shin-ichirou Murakami, Okazaki (JP); Masaki Nishide, Okazaki (JP); Tatsuya Oba, Nishio (JP)

(73) Assignee: Aisin AW Co., Ltd., Anjo (JP)

( * ) Notice: Subject to any disclaimer, the term of this patent is extended or adjusted under 35 U.S.C. 154(b) by 237 days.

(21) Appl. No.: 13/258,721

(22) PCT Filed: Aug. 27, 2010

(86) PCT No.: PCT/JP2010/005306
§ 371 (c)(1),
(2), (4) Date: Sep. 22, 2011

(87) PCT Pub. No.: WO2011/027527
PCT Pub. Date: Mar. 10, 2011

(65) Prior Publication Data
US 2012/0010794 A1 Jan. 12, 2012

(30) Foreign Application Priority Data
Sep. 4, 2009 (JP) .................................. 2009-205205

(51) Int. Cl.
*F16H 59/00* (2006.01)
*G06F 19/00* (2011.01)

(52) U.S. Cl.
USPC ................................ 701/58; 701/62; 701/64

(58) Field of Classification Search
USPC ........... 701/58, 66, 62, 64; 192/48.4; 475/16
See application file for complete search history.

(56) References Cited

U.S. PATENT DOCUMENTS

| 6,357,289 | B1 | 3/2002 | Futawatari | |
| 6,543,593 | B2* | 4/2003 | Saito | 192/48.4 |
| 7,462,130 | B2 | 12/2008 | Ota et al. | |
| 2007/0078042 | A1 | 4/2007 | Yoneyama | |
| 2008/0234088 | A1* | 9/2008 | Kawaguchi et al. | 475/16 |
| 2009/0171545 | A1 | 7/2009 | Shimizu et al. | |

FOREIGN PATENT DOCUMENTS

| EP | 1 039 179 A2 | 9/2000 |
| JP | A-5-126246 | 5/1993 |
| JP | A-2000-009224 | 1/2000 |
| JP | A-2001-059570 | 3/2001 |

(Continued)

OTHER PUBLICATIONS

Written Opinion issued in International Application No. PCT/JP2010/005306 dated Dec. 15, 2010.

(Continued)

*Primary Examiner* — Tan Q Nguyen
(74) *Attorney, Agent, or Firm* — Oliff & Berridge, PLC (57) ABSTRACT In an operation of controlling an automatic transmission, an engagement pressure for each hydraulic servo in a normal operation is determined so that none of friction engagement elements slips at each shift speed in the normal operation, and so that in case of a failure in which the friction engagement element that is supposed to be disengaged in the normal operation is engaged, one of the friction engagement elements slips, and thus one of the shift speeds is established. In the control operation, upon detection of a failure state in which a gear ratio after a shift operation is a gear ratio of a shift speed different from a shift speed to be established, the slipping friction engagement element is disengaged, and the shift speed that is different from the shift speed to be established is temporarily retained.

12 Claims, 7 Drawing Sheets

(56) References Cited

FOREIGN PATENT DOCUMENTS

| | | |
|---|---|---|
| JP | A-2006-300285 | 11/2006 |
| JP | A-2007-024096 | 2/2007 |
| JP | A-2007-255518 | 10/2007 |
| WO | WO 2009/084294 A1 | 7/2009 |

OTHER PUBLICATIONS

International Search Report issued in International Application No. PCT/JP2010/005306 dated Dec. 15, 2010.

Partial translation of Oct. 23, 2012 Office Action issued in Japanese Patent Application No. 2010-199302.

* cited by examiner

|     | C-1 | C-2 | C-3 | B-1 | B-2 | F-1 |
|-----|-----|-----|-----|-----|-----|-----|
| P   |     |     |     |     |     |     |
| REV |     |     | ◯   |     | ◯   |     |
| N   |     |     |     |     |     |     |
| 1ST | ◯   |     |     |     | (◯) | ◯   |
| 2ND | ◯   |     |     | ◯   |     |     |
| 3RD | ◯   |     | ◯   |     |     |     |
| 4TH | ◯   | ◯   |     |     |     |     |
| 5TH |     | ◯   | ◯   |     |     |     |
| 6TH |     | ◯   |     | ◯   |     |     |

※(◯) : DURING ENGINE BRAKING

CONTROL APPARATUS FOR AUTOMATIC TRANSMISSION AND CONTROL METHOD THEREOF

TECHNICAL FIELD

The present invention relates to control apparatuses for automatic transmissions that are mounted on, e.g., vehicles and the like, and control methods thereof. More particularly, the present invention relates to control apparatuses for automatic transmissions, which are structured so that none of friction engagement elements slips at each shift speed in a normal operation, and so that in the event of a failure in which a friction engagement element that is supposed to be disengaged in the normal operation is engaged, one of the friction engagement elements slips, and thus one of the shift speeds is established.

BACKGROUND ART

For example, in multi-stage automatic transmissions that are mounted on vehicles and the like, linear solenoid valves can fail to be turned off in addition to frictional engagement elements (clutches and brakes) that are engaged in a normal operation. In this case, a friction engagement element that is supposed to be disengaged can be engaged. If all these friction engagement elements are simultaneously engaged, the automatic transmission can be stalled. Thus, valves for preventing such simultaneous engagement of the friction engagement elements (so-called cutoff valves) are typically provided. The cutoff valves prevent simultaneous engagement of the friction engagement elements by cutting off an engagement pressure of one friction engagement element when engagement pressures of these friction engagement elements are simultaneously applied.

However, as the number of stages of the automatic transmissions is increased for improved fuel consumption of vehicles or the like, a large number of friction engagement elements are required, and thus a large number of cutoff valves are required. This can hinder implementation of compact automatic transmissions, and reduction in cost.

Thus, it has been proposed to preset the engagement pressures of the friction engagement elements that are to be engaged in a normal operation to low pressures. Accordingly, the engagement pressures of the friction engagement elements that are to be engaged in a normal operation are calculated based on torque sharing of the friction engagement elements, so that the frictional engagement elements are engaged without slipping at each shift speed in the normal operation. If, e.g., any of linear solenoid valves fails to be turned off, and a friction engagement element that is supposed to be disengaged is engaged, the torque sharing changes, and one of the friction engagement elements slips due to the driving force of a drive source, and the driving force of driving wheels, whereby one of shift speeds is established (so that the stalled state is prevented). (see PCT International Patent Application Publication No. WO/2009/084294).

In PCT International Patent Application Publication No. WO/2009/084294, if, e.g., any of the linear solenoid valves actually fails to be turned off, and a friction engagement element that is supposed to be disengaged is engaged, one of the friction engagement elements slips. That is, a power-transmitting engagement element in that friction engagement element, and a power-receiving engagement element in that friction engagement element frictionally slip with respect to each other. If this state lasts for a long time, the frictionally slipping friction engagement element generates heat, which is not preferable in terms of durability.

SUMMARY OF INVENTION

The present invention provides a control apparatus and control method for an automatic transmission, in which in case of a failure in which a friction engagement element that is supposed to be disengaged is engaged, one of friction engagement elements slips, and thus one of shift speeds is established, and the slipping friction engagement element can be protected.

A first aspect of the present invention (see, e.g., FIGS. 1 to 7) relates to a control apparatus for an automatic transmission. The control apparatus controls a plurality of pressure regulating solenoid valves for regulating and controlling an engagement pressure to be supplied to or removed from each hydraulic servo of a plurality of friction engagement elements. The control apparatus also determines the engagement pressure to be supplied to or removed from the each hydraulic servo in a normal operation, so that none of the friction engagement elements slips at each shift speed in the normal operation, and so that in case of a failure in which the friction engagement element that is supposed to be disengaged in the normal operation is engaged, one of the friction engagement elements slips, and thus one of the shift speeds is established. The control apparatus includes: a failure detecting portion that detects the failure when a gear ratio is a gear ratio of a shift speed different from a shift speed to be established; and a shift speed retaining portion that disengages the slipping friction engagement element, and retaining the shift speed that is different from the shift speed to be established, when the failure detecting portion detects the failure.

In this control apparatus, in the event of the failure in which the friction engagement element that is supposed to be disengaged is engaged, one of the friction engagement elements slips, whereby one of the shift speeds is established. When the failure is detected by the failure detecting portion, the shift speed retaining portion disengages the slipping friction engagement element, and retains the shift speed different from the selected shift speed. This can prevent the slipping friction engagement element from frictional slipping for a long time, and thus can protect this friction engagement element.

The control apparatus (see, e.g., FIGS. 4 to 6) may further include a shift speed releasing portion that releases the shift speed retained by the shift speed retaining portion, based on a predetermined condition.

According to this control apparatus, the shift speed releasing portion releases the shift speed retained by the shift speed retaining portion, based on the predetermined condition. Thus, even if the shift speed is retained by the shift speed retaining portion due to temporary malfunction, the shift speed releasing portion can release the retained shift speed to attempt the shift operation again. That is, if the failure is detected by the failure detecting portion due to temporary malfunction, shift control can be returned to normal shift control.

In the control apparatus (see, e.g., FIGS. 4 to 6), the predetermined condition may be that a predetermined time has passed.

According to this control apparatus, the predetermined condition for releasing the shift speed retained by the shift speed retaining portion is that the predetermined time has passed. Thus, the friction engagement element having generated heat due to slipping can be sufficiently cooled, and can be protected.

The control apparatus (see, e.g., FIG. 4) may further include a shift speed selecting portion that selects as needed a shift speed to be established in the normal operation, based on a traveling condition. In this control apparatus, the predetermined condition may be that the shift speed selected by the shift speed selecting portion matches the retained shift speed.

According to this control apparatus, the predetermined condition for releasing the shift speed retained by the shift speed retaining portion is that the shift speed selected by the shift speed selecting portion matches the retained shift speed. Thus, the shift control returns to the normal shift control. In this case, there is no possibility that the friction engagement element having generated heat due to slipping is quickly reengaged, whereby this friction engagement element can be protected.

In the control apparatus (see, e.g., FIG. 4), the predetermined condition may be that stopping of a vehicle is detected.

According to this control apparatus, the predetermined condition for releasing the shift speed retained by the shift speed retaining portion is that stopping of the vehicle is detected. Thus, the friction engagement element having generated heat due to slipping does not rotate even if it is reengaged. Accordingly, this friction engagement element does not frictionally slip, whereby this friction engagement element can be protected.

The control apparatus (see, e.g., FIGS. 4 to 7) may further include: a counter portion that increments a counter every time the shift speed retaining portion retains the shift speed that is different from the shift speed to be established; and an emergency control portion that switches a control operation of the control apparatus to an emergency mode for performing failsafe control, when the counter counted by the counter portion reaches a predetermined value.

According to this control apparatus, the counter portion increments the counter every time the shift speed retaining portion retains the shift speed different from the shift speed to be established. When the counter reaches the predetermined value, the emergency control portion switches the control operation of the control apparatus to the emergency mode for performing the failsafe control. Thus, the operation state can be switched to a failsafe state in the event of a permanent failure state that is not temporary malfunction.

In the control apparatus (see, e.g., FIGS. 4 to 7), the emergency mode may be a mode in which the shift speed different from the shift speed to be established is retained until a vehicle speed becomes equal to or lower than a predetermined value.

According to this control apparatus, the emergency mode is a mode in which the shift speed different from the shift speed to be established is retained until the vehicle speed becomes equal to or lower than the predetermined value. This can reliably prevent a stalled state resulting from engagement of the friction engagement element that is supposed to be disengaged. For example, when the vehicle speed becomes equal to or lower than the predetermined value, the automatic transmission is shifted to a lower shift speed that can be established and can start the vehicle. Thus, the vehicle can be restarted even in the emergency mode.

The control apparatus (see, e.g., FIGS. 4 and 5) may further include: an over-revolution determining portion that determines if over-revolution of a drive source will occur or not, when the shift speed retaining portion retains the shift speed different from the shift speed to be established; and an over-revolution avoiding portion that controls the plurality of pressure regulating solenoid valves to shift the automatic transmission to a neutral state, when the over-revolution determining portion determines that the over-revolution of the drive source will occur.

According to this control apparatus, if the over-revolution determining portion determines that over-revolution of the drive source is going to occur, when the shift speed retaining portion retains the shift speed different from the shift speed to be established, the over-revolution avoiding portion controls the plurality of pressure regulating linear solenoid valves to shift the automatic transmission into the neutral state. This can prevent over-revolution of the drive source, and thus can protect the drive source.

A second aspect of the present invention (see, e.g., FIGS. 1 to 7) relates to a method for controlling an automatic transmission. In this control method, a plurality of pressure regulating solenoid valves for regulating and controlling an engagement pressure to be supplied to or removed from each hydraulic servo of a plurality of friction engagement elements are controlled. The engagement pressure to be supplied to or removed from the each hydraulic servo in a normal operation is determined so that none of the friction engagement elements slips at each shift speed in the normal operation, and so that in case of a failure in which the friction engagement element that is supposed to be disengaged in the normal operation is engaged, one of the friction engagement elements slips, and thus one of the shift speeds is established. This control method includes: detecting the failure when a gear ratio is a gear ratio of a shift speed different from a shift speed to be established; and disengaging the slipping friction engagement element, and retaining the shift speed different from the shift speed to be established, when the failure is detected.

BRIEF DESCRIPTION OF DRAWINGS

The features, advantages, and technical and industrial significance of this invention will be described in the following detailed description of example embodiments of the invention with reference to the accompanying drawings, in which like numerals denote like elements, and wherein.

DESCRIPTION OF EMBODIMENTS

An embodiment of the present invention will be described with reference to FIGS. 1 to 7.

General Structure of Automatic Transmission

Figure 1:
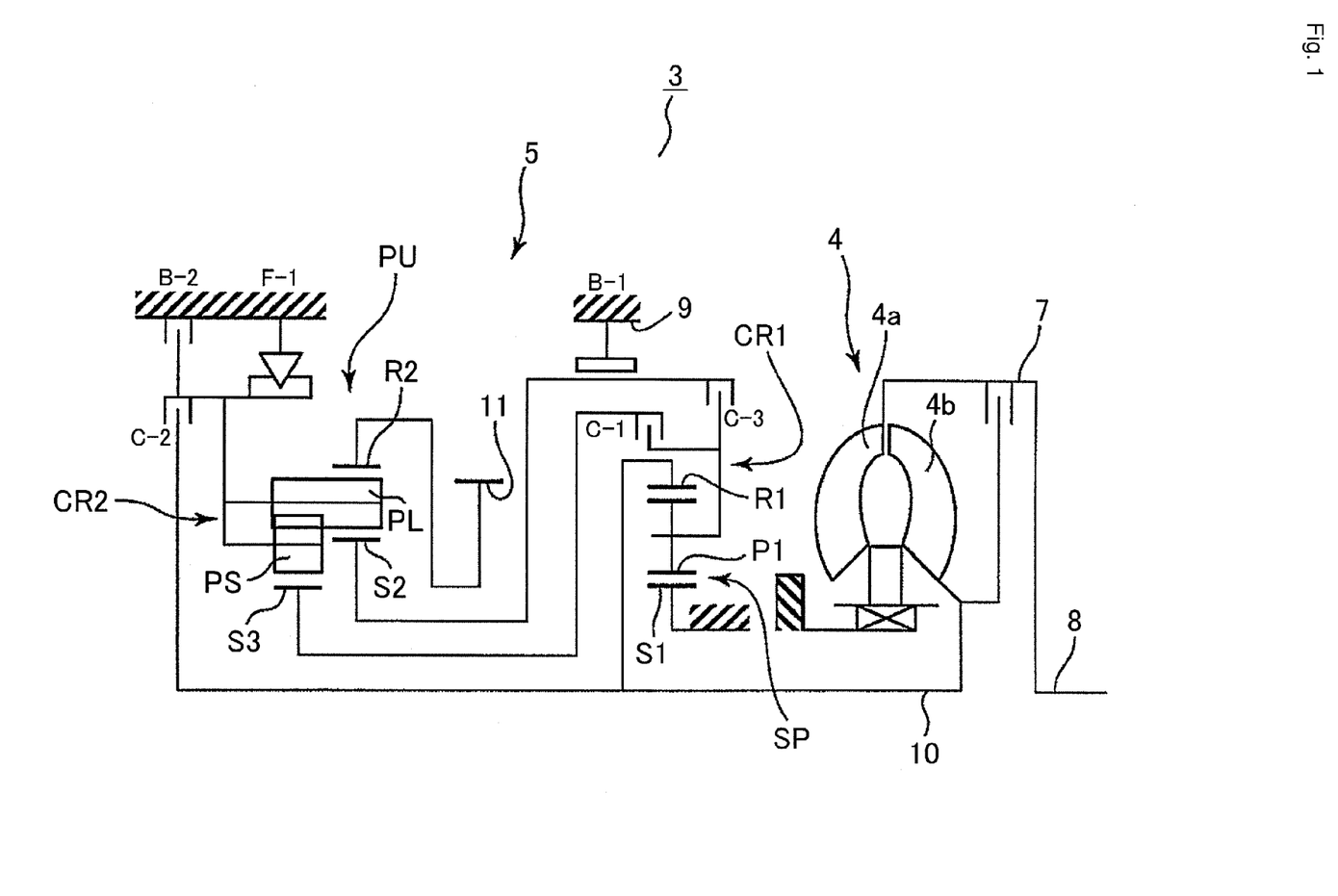
FIG. 1 is a skeleton diagram showing an automatic transmission to which the present invention can be applied.

First, the general structure of an automatic transmission 3 to which the present invention can be applied will be described with reference to FIG. 1. As shown in FIG. 1, the automatic transmission 3 has an automatic transmission input shaft 8 that can be connected to an engine 2 as a drive source (see FIG. 4), and includes a torque converter 4 and an automatic speed change mechanism 5, which are provided about an axial direction of the input shaft 8. It is preferable to use the automatic transmission 3 in, e.g., FF (front engine, front drive) type vehicles, The torque converter 4 has a pump impeller 4a connected to the input shaft 8 of the automatic transmission 3, and a turbine runner 4b to which rotation of the pump impeller 4a is transmitted via a working fluid. The turbine runner 4b is connected to an input shaft 10 of the automatic speed change mechanism 5. The input shaft 10 is provided coaxially with the input shaft 8. The torque converter 4 is provided with a lockup clutch 7. When the lockup clutch 7 is engaged, rotation of the input shaft 8 of the automatic transmission 3 is directly transmitted to the input shaft 10 of the automatic speed change mechanism 5.

The automatic speed change mechanism 5 is provided with a planetary gear SP and a planetary gear unit PU on the input shaft 10. The planetary gear SP includes a sun gear S1, a carrier CR1, and a ring gear R1. The carrier CR1 has a pinion P1 that meshes with the sun gear S1 and the ring gear R1. The planetary gear SP is a so-called single-pinion planetary gear.

The planetary gear unit PU has a sun gear S2, a sun gear S3, a carrier CR2, and a ring gear R2 as four rotary elements. The carrier CR2 is provided with a long pinion PL and a short pinion PS so that the long pinion PL and the short pinion PS mesh with each other. The long pinion PL meshes with the sun gear S2 and the ring gear R2, and the short pinion PS meshes with the sun gear S3. The planetary gear unit PU is a so-called Ravigneaux type planetary gear unit.

The sun gear S1 of the planetary gear SP is connected to a boss portion, not shown, which is integrally fixed to a transmission case 9, whereby the sun gear S1 is held stationary. Rotation of the ring gear R1 is the same as that of the input shaft 10 (hereinafter referred to as "input rotation"). The input rotation is reduced in speed by the stationary sun gear S1 and the ring gear R1 that provides the input rotation, whereby the carrier CR1 provides the reduced rotation. The carrier CR1 is connected to a clutch C-1 (a friction engagement element) and a clutch C-3 (a friction engagement element).

Since the sun gear S2 of the planetary gear unit PU is connected to a brake B-1 (a friction engagement element) that is formed by a band brake, the sun gear S2 can be fixed to the transmission case 9. Moreover, since the sun gear S2 is connected also to the clutch C-3, the reduced rotation of the carrier CR1 can be input to the sun gear S2 via the clutch C-3. Since the sun gear S3 is connected to the clutch C-1, the reduced rotation of the carrier CR1 can be input to the sun gear S3 via the clutch C-1.

Moreover, the carrier CR2 is connected to a clutch C-2 (a friction engagement element) that receives the rotation of the input shaft 10. Thus, the input rotation can be input to the carrier CR2 via the clutch C-2. The carrier CR2 is connected also to a one-way clutch F-1 and a brake B-2 (a friction engagement element). Thus, rotation of the carrier CR2 in one direction with respect to the transmission case 9 is restricted via the one-way clutch F-1, and the carrier CR2 can be held stationary via the brake B-2. The ring gear R2 is connected to a counter gear 11. The counter gear 11 is connected to driving wheels via a countershaft and a differential unit, which are not shown.

Figure 2:
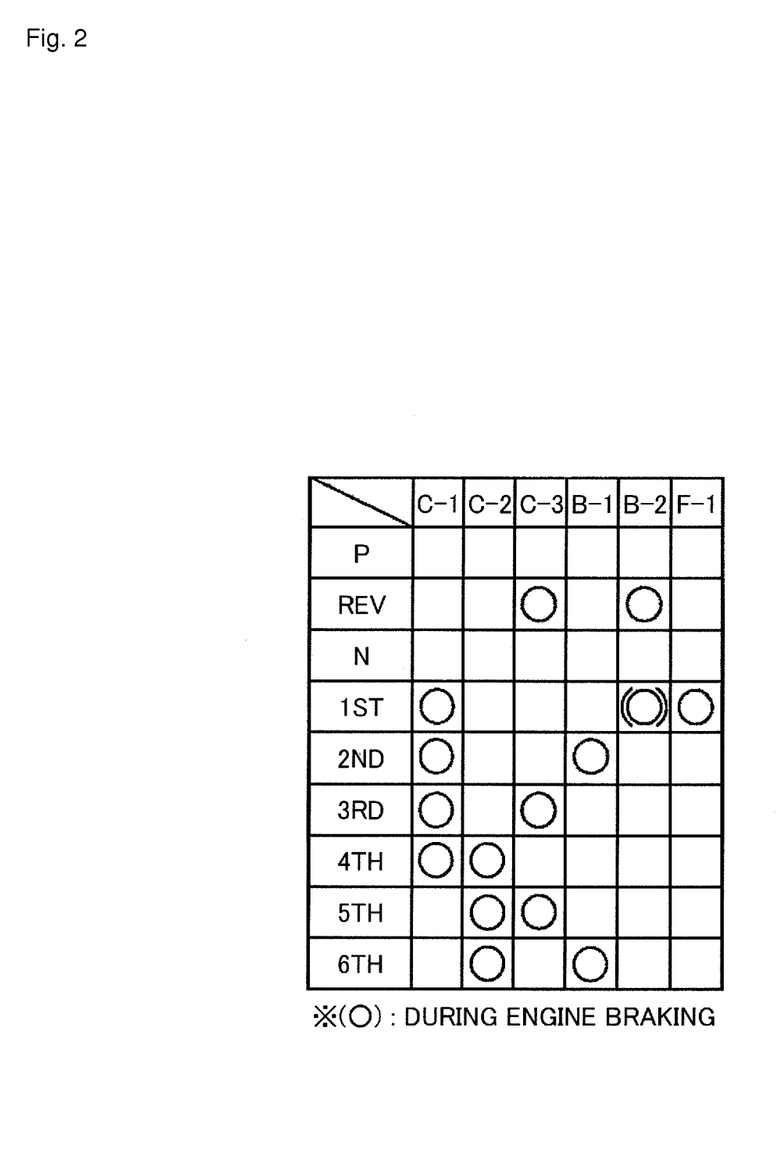
FIG. 2 is an operation table of the automatic transmission shown in FIG. 1.

The clutches C-1 to C-3, the brakes B-1 to B-2, and the one-way clutch F-1 operate as shown in the operation table of FIG. 2 at the first to sixth forward speeds and the reverse speed. Thus, the automatic transmission 3 structured as described above achieves the gear ratio of each shift speed with a satisfactory step ratio. Shift control is performed by changing the engagement/disengagement states of the plurality of clutches C-1 to C-3 and brakes B-1 to B-2. Except during driving at the first forward speed (i.e., the low shift speed), two of the clutches C-1 to C-3 and the brakes B-1 to B-2 are engaged to achieve each shift speed.

General Structure of Hydraulic Control Apparatus

Figure 3:
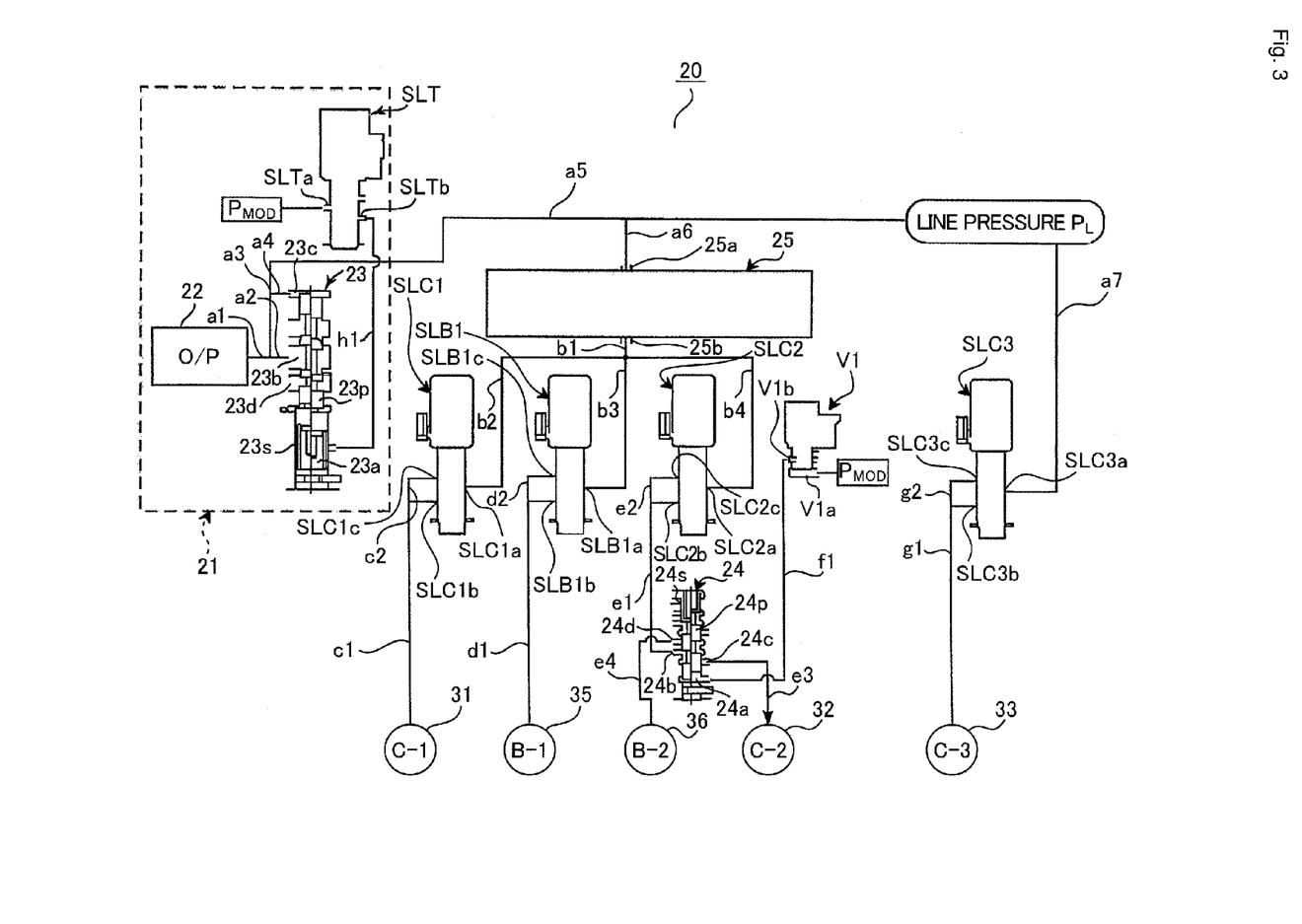
FIG. 3 is a schematic circuit diagram showing a hydraulic control apparatus for the automatic transmission to which the present invention can be applied.

A hydraulic control apparatus 20 for the automatic transmission according to the present invention will be described below with reference to FIG. 3. The hydraulic control apparatus 20 includes, as, e.g., a line pressure regulating portion 21 for regulating and producing a line pressure $P_L$, an oil pump (O/P) 22 that is coupled to and driven by the input shaft 8, a primary regulator valve 23, and a linear solenoid valve SLT. The oil pump 22 is connected to a pressure regulating port 23b of the primary regulator valve 23 via oil passages a1, a2. The primary regulator valve 23 has a spool 23p, a spring 23s for biasing the spool 23p upward in the figure, a hydraulic oil chamber 23a, the pressure regulating port 23b, a feedback oil chamber 23c, and an exhaust port 23d. The hydraulic oil chamber 23a is connected to an output port SLTb of the linear solenoid valve SLT via an oil passage h1. The feedback oil chamber 23c is connected to the pressure regulating port 23b via the oil passages a2, a3 and a4.

On the other hand, the linear solenoid valve SLT is of a normally opened type, which has no output when no current is supplied. The linear solenoid valve SLT has an input port SLTa and the output port SLTb. A modulator pressure $P_{MOD}$, which is the line pressure $P_L$ reduced to a predetermined value by a modulator valve, not shown, is applied to the input port SLTa. The linear solenoid valve SLT outputs a regulated SLT pressure PSLT from the output port SLTb. The linear solenoid valve SLT increases the amount by which the input port SLTa and the output port SLTb communicate with each other, according to, e.g., a throttle opening degree.

That is, an oil pressure generated in the oil pump 22 is applied to the feedback oil chamber 23c of the primary regulator valve 23, and presses the spool 23p downward in the figure, whereby the pressure regulating port 23b and the exhaust port 23d communicate with each other, and the oil pressure is discharged from the exhaust port 23d. Thus, especially when no SLT pressure PSLT is applied to the hydraulic oil chamber 23a, the line pressure $P_L$ to be output to an oil passage a5 is regulated at the lowest value. If the SLT pressure PSLT applied from the linear solenoid valve SLT to the hydraulic oil chamber 23a is increased according to an increase in throttle opening degree, the SLT pressure PSLT presses the spool 23p upward in the figure, whereby the pressure regulating port 23b and the exhaust port 23d are gradually closed, and the line pressure $P_L$ to be output to the oil passage a5 is increased. Note that the exhaust port 23d is connected to a pressure regulating port of a secondary regulator valve, not shown, and a secondary pressure, which is regulated by the secondary regulator valve, is used as a circulating pressure for the torque converter 4, an engagement pressure for the lockup clutch 7, a lubricant pressure, or the like.

The line pressure $P_L$ thus regulated by the line pressure regulating portion 21 is supplied to an input port 25a of a manual shift valve 25 via the oil passage a5 and an oil passage a6, and to an input port SLC3a of a linear solenoid valve SLC3, described below, via an oil passage a7. The line pressure $P_L$ supplied to the input port 25a of the manual shift valve 25 is output to an oil passage b1 as a forward range pressure PD from an output port 25b when the driver operates a shift lever, not shown, to a D range (i.e., a drive range). The forward range pressure PD thus output to the oil passage b1 is supplied to an input port SLC1a of a linear solenoid valve SLC1 via an oil passage b2, to an input port SLB1a of a linear solenoid valve SLB1 via an oil passage b3, and to an input port SLC2a of a linear solenoid valve SLC2 via an oil passage b4.

The linear solenoid valve SLC1 as a pressure regulating solenoid valve is of a normally closed type, which has no output when no current is supplied. The linear solenoid valve SLC1 has the input port SLC1a, an output port SLC1b, and a feedback port SLC1c. The linear solenoid valve SLC1 regulates and controls the forward range pressure PD, and outputs a control pressure PSLC1 (that is, an engagement pressure PC1) from the output port SLC1b to a hydraulic servo 31 via an oil passage c1. The feedback port SLC1c is used to feedback the control pressure PSLC1 via an oil passage c2.

That is, when no current is supplied, the linear solenoid valve SLC1 disconnects the input port SLC1a and the output port SLC1b from each other. Thus, the linear solenoid valve SLC1 has no output. When a current is supplied based on a command value from a control unit (ECU) 50 described below, the linear solenoid valve SLC1 increases the amount by which the input port SLC1a and the output port SLC1b communicate with each other (the opening amount), according to the command value. That is, the linear solenoid valve SLC1 can output the engagement pressure PC1 according to the command value. The clutch C-1 is engaged or disengaged by the engagement pressure PC1 that is supplied or removed from the hydraulic servo 31.

The linear solenoid valve SLB1 as a pressure regulating solenoid valve is of a normally closed type, which has no output when no current is supplied. The linear solenoid valve SLB1 has the input port SLB1a, an output port SLB1b, and a feedback port SLB1c. The linear solenoid valve SLB1 regulates and controls the forward range pressure PD, and outputs a control pressure PSLB1 (that is, an engagement pressure PB1) from the output port SLB1b to a hydraulic servo 35 via an oil passage d1. The feedback port SLB1c is used to feedback the control pressure PSLB1 via an oil passage d2.

That is, when no current is supplied, the linear solenoid valve SLB1 disconnects the input port SLB1a and the output port SLB1b from each other. Thus, the linear solenoid valve SLB1 has no output. When a current is supplied based on a command value from the ECU 50, the linear solenoid valve SLB1 increases the amount by which the input port SLB1a and the output port SLB1b communicate with each other (the opening amount), according to the command value. That is, the linear solenoid valve SLB1 can output the engagement pressure PB1 according to the command value. The brake B-1 is engaged or disengaged by the engagement pressure PB1 that is supplied to or removed from the hydraulic servo 35.

The linear solenoid valve SLC2 as a pressure regulating solenoid valve is of a normally open type, which has an output when no current is supplied. The linear solenoid valve SLC2 has the input port SLC2a, an output port SLC2b, and a feedback port SLC2c. The linear solenoid valve SLC2 regulates and controls the forward range pressure PD, and outputs a control pressure PSLC2 as an engagement pressure PC2 from the output port SLC2b to a hydraulic servo 32 via an oil passage e1, a C2 relay valve 24 described below, and an oil passage e3. The linear solenoid valve SLC2 also outputs a control pressure PSLC2 as an engagement pressure PB2 from the output port SLC2b to a hydraulic servo 36 via the oil passage e1, the C2 relay valve 24 described below, and an oil passage e4. The feedback port SLC2c is used to feedback the control pressure PSLC2 via an oil passage e2.

That is, when no current is supplied, the linear solenoid valve SLC2 allows the input port SLC2a and the output port SLC2b to communicate with each other. Thus, the linear solenoid valve SLC2 has an output. When a current is supplied based on a command value from the ECU 50, the linear solenoid valve SLC2 reduces the amount by which the input port SLC2a and the output port SLC2b communicate with each other, according to the command value. That is, the linear solenoid valve SLC2 can output the engagement pressure PC2 or the engagement pressure PB2 according to the command value. The clutch C-2 or the brake B-2 is engaged or disengaged by the engagement pressure PC2 or the engagement pressure PB2 that is supplied to or removed from the hydraulic servo 32 or the hydraulic servo 36.

The C2 relay valve 24 interposed between the oil passage e1 and the oil passage e3 or e4 has a spool 24p, a spring 24s for biasing the spool 24p downward in the figure, a hydraulic oil chamber 24a, an input port 24b connected to the oil passage e1, an output port 24c connected to the oil passage e3, and an output port 24d connected to the oil passage e4.

A solenoid valve V1 is of a normally open type, which has an output when no current is supplied. The solenoid valve V1 has an input port V1a and an output port V1b. The modulator pressure $P_{MOD}$ is applied from the modulator valve, not shown, to the input port V1a. The output port V1b is connected to the hydraulic oil chamber 24a of the C2 relay valve 24 via an oil passage f1. During a normal operation, the solenoid valve V1 is turned on to have no output. When engaging the brake B-2 (that is, during engine braking at the first forward speed, or during reverse traveling), the solenoid valve V1 is turned off to output a signal pressure PS1.

That is, during a normal operation, the C2 relay valve 24 is located in the left position in the figure, based on the biasing force of the spring 24s. When the linear solenoid valve SLC2 outputs the control pressure PSLC2, the C2 relay valve 24 outputs the control pressure PSLC2 as the engagement pressure PC2 from the output port 24c to the hydraulic servo 32. When the solenoid valve V1 is turned off based on a command value of the ECU 50, the signal pressure PS1 applied to the hydraulic oil chamber 24a becomes larger than the biasing force of the spring 24c, and the C2 relay valve 24 is shifted to the right position in the figure. When the linear solenoid valve SLC2 outputs the control pressure PSLC2 in this state, the C2 relay valve 24 outputs the control pressure PSLC2 as the engagement pressure PB2 from the output port 24d to the hydraulic servo 36.

On the other hand, the linear solenoid valve SLC3 as a pressure regulating solenoid valve is of a normally open type, which has an output when no current is supplied. The linear solenoid valve SLC3 has the input port SLC3a, an output port SLC3b, and a feedback port SLC3c. The oil passage a7 is connected to the input port SLC3a, and the line pressure $P_L$ is applied to the input port SLC3a. The linear solenoid valve SLC3 regulates and controls the line pressure $P_L$, and outputs a control pressure PSLC3 as an engagement pressure PC3 from the output port SLC3b to a hydraulic servo 33 via an oil passage g1. The feedback port SLC3c is used to feedback the control pressure PSLC3 (i.e., the engagement pressure PC3) via an oil passage g2.

That is, when no current is supplied, the linear solenoid valve SLC3 allows the input port SLC3a and the output port SLC3b to communicate with each other. Thus, the linear solenoid valve SLC3 has an output. When a current is supplied based on a command value from the ECU 50, the linear solenoid valve SLC3 reduces the amount by which the input port SLC3a and the output port SLC3b communicate with each other, according to the command value. That is, the linear solenoid valve SLC3 can output the engagement pressure PC3 according to the command value. The clutch C-3 is engaged or disengaged by the engagement pressure PC3 that is supplied to or removed from the hydraulic servo 33.

The current supply state of each linear solenoid valve SLC1, SLC2, SLC3, SLB1 and the solenoid valve V1 is controlled based on a command of the ECU 50, whereby the hydraulic control apparatus 20 structured as described above achieves each engagement state of the first to sixth forward speeds and the reverse speed as shown in FIG. 2.

Structure of Control Apparatus for Automatic Transmission

Figure 4:
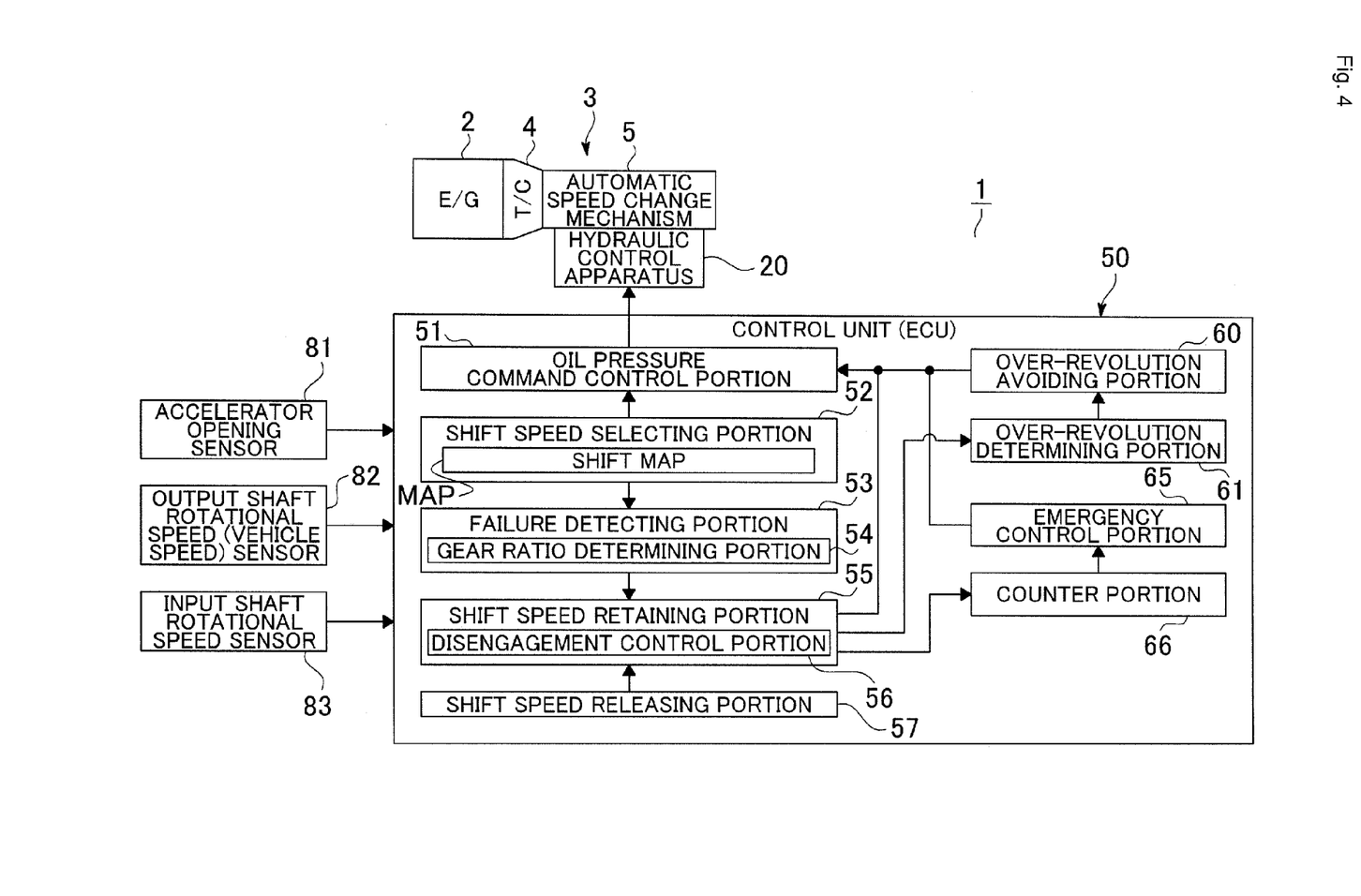
FIG. 4 is a block diagram showing a control apparatus for the automatic transmission according to an embodiment of the present invention.

A control apparatus 1 for the automatic transmission, which is a main part of the present invention, will be described below with reference to FIG. 4. As shown in FIG. 4, the control apparatus 1 for the automatic transmission has the control unit (ECU) 50. An accelerator opening sensor 81, an output shaft rotational speed (vehicle speed) sensor 82, an input shaft rotational speed sensor 83, and the like are connected to the ECU 50. The ECU 50 includes: an oil pressure command control portion 51; a shift speed selecting portion 52 having a shift map MAP; a failure detecting portion 53 having a gear ratio determining portion 54; a shift speed retaining portion 55 having a disengagement control portion 56; a shift speed releasing portion 57; an over-revolution avoiding portion 60; an over-revolution determining portion 61; an emergency control portion 65; and a counter portion 66.

Functions of Control Apparatus for Automatic Transmission

Figure 5:
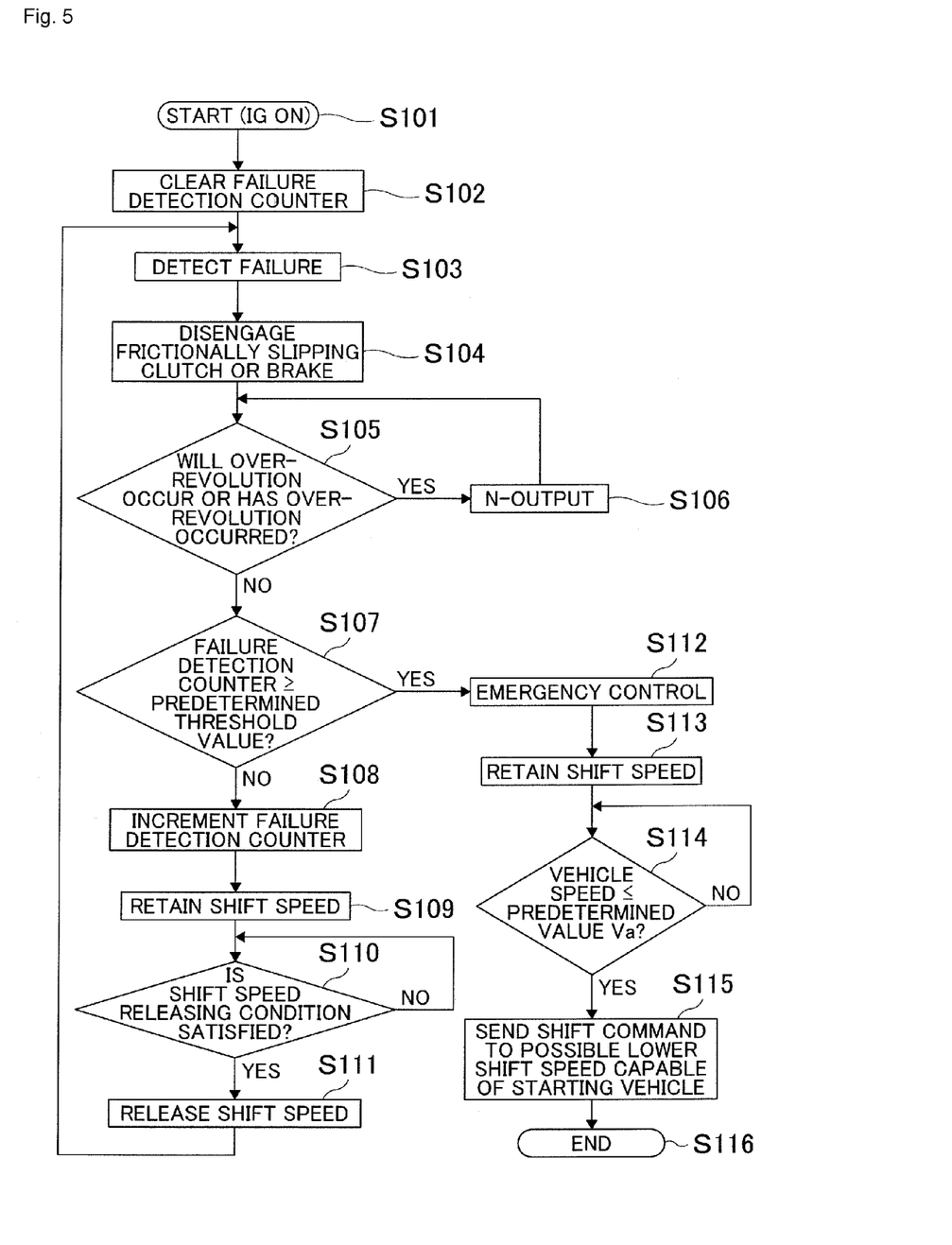
FIG. 5 is a flowchart illustrating shift speed retaining control and emergency control according to the embodiment of the present invention.

The control apparatus 1 for the automatic transmission starts control of the ECU 50 when, e.g., an ignition switch IG (not shown) is turned on (S101 in FIG. 5). First, the counter portion 66 clears a failure detection counter to zero (S102 in FIG. 5). The failure detection counter will be described later in detail.

For example, if the shift lever, not shown, is in the D range in a normal operation, the shift speed selecting portion 52 selects an optimal shift speed, as needed, by referring to the shift map MAP based on an accelerator opening degree THd detected by the accelerator opening sensor 81, and a rotational speed Nout of the output shaft (in the present embodiment, the counter gear 11) (i.e., a vehicle speed V) detected by the output shaft rotational speed sensor 82 (that is, based on the traveling condition). The shift speed selecting portion 52 sends a command to the oil pressure command control portion 51 so that the selected shift speed is achieved. The oil pressure command control portion 51 electronically controls the linear solenoid valves SLC1, SLC2, SLC3, SLB1 and the solenoid valve V1 of the hydraulic control apparatus 20 to engage or disengage the clutches and the brakes as shown in FIG. 2. Each shift speed is attained in this manner.

Note that, in the shift map MAP, shift points (upshift and downshift points) corresponding to each shift speed are recorded in advance in association with the acceleration opening degree THd and the rotational speed Nout of the output shaft. For example, if the driver selects a shift speed in vehicles whose shift speed can be selected by the driver with a shift lever or the like, the shift speed selecting portion 52 selects the shift speed selected by, e.g., the driver with the shift lever or the like.

When sending a command to the linear solenoid valves SLC1, SLC2, SLC3, SLB1 of the hydraulic control apparatus 20, the oil pressure command control portion 51 calculates the magnitude of torque to be transferred by the clutches C-1 to C-3 and the brakes B-1, B-2, based on, e.g., an engine torque (i.e., an engine torque signal) input from the engine 2, and torque sharing of the clutches C-1 to C-3 and the brakes B-1, B-2 at each shift speed (i.e., the first to sixth forward speeds). The oil pressure command control portion 51 also calculates the engagement pressures PC1, PC2, PC3, PB1, PB2 to be supplied to or removed from the hydraulic servos 31, 32, 33, 35, 36 of the clutches C-1 to C-3 and the brakes B-1, B-2, so that the torque capacity becomes equal to the torque to be transferred multiplied by a safety factor (e.g., 1.1) (see PCT International Patent Application Publication No. WO/2009/084294).

Thus, none of the clutches C-1 to C-3 and the brakes B-1, B-2 slips at each shift speed (i.e., the first to six forward speeds) in a normal operation. For example, even if the linear solenoid valves SLC1, SLC2, SLC3, SLB1 output the highest oil pressure (i.e., an oil pressure corresponding to the line pressure $P_L$), and one of the clutches C-1 to C-3 and the brakes B-1, B-2, which is supposed to be disengaged, is engaged, one of the clutches C-1 to C-3 and the brakes B-1, B-2, that is, one of the engaged three friction engagement elements, slips. In other words, simultaneous engagement of the three friction engagement elements is prevented, and a stalled state is avoided.

On the other hand, when the vehicle travels at a shift speed selected by the shift speed selecting portion 52 as described above, the gear ratio determining portion 54 calculates a gear ratio as needed, based on the input rotational speed detected by the input shaft rotational speed sensor 83, and the output shaft rotational speed detected by the output shaft rotational speed sensor 82. The failure detecting portion 53 detects a failure state when the gear ratio of a shift speed that is different from the shift speed selected by the shift speed selecting portion 52 after a shift operation is established (i.e., when a neutral state is not established) (S103 in FIG. 5). This failure state is a state in which three friction engagement elements attempt to be engaged simultaneously, and one of them is slipping.

Note that, according to the selected shift speed, and a shift speed obtained by an actual gear ratio, the failure detecting portion 53 can determine which of the friction engagement elements is slipping and which of the friction engagement elements cannot be disengaged, by using pre-calculated failure pattern data (see, e.g., FIG. 7 of PCT International Patent Application Publication No. WO/2009/084294).

If the failure detecting portion 53 detects the failure state, the disengagement control portion 56 first sends a command to the linear solenoid valve that is regulating the engagement pressure of the slipping friction engagement element (i.e., the frictionally slipping clutch or brake), so as to disengage this friction engagement element. Thus, this friction engagement element is disengaged (S104 in FIG. 5).

Then, the over-revolution determining portion 61 determines if over-revolution of the engine 2 will occur or not, or if over-revolution of the engine 2 is occurring or not, due to, e.g., a downshift in a current condition (a condition in which a shift speed different from the selected shift speed has been established) (S105 in FIG. 5). If the over-revolution determining portion 61 determines that the over-revolution will occur, or that the over-revolution is occurring (Yes in S105 in FIG. 5), the over-revolution avoiding portion 60 sends a neutral command (an N-output) to the linear solenoid valves SLC1, SLC2, SLC3, SLB1 according to the determination of the over-revolution determining portion 61, so as to shift the automatic transmission 3 to a neutral state (S106 in FIG. 5). If the over-revolution determining portion 61 determines that no over-revolution will occur or is occurring, the control proceeds to step S107 in FIG. 5.

In step S107 in FIG. 5, the counter portion 66 in FIG. 4 determines if the failure detection counter is equal to or larger than a predetermined threshold value (i.e., a predetermined value). Since the failure detection counter has been cleared in step S102, it is determined that the failure detection counter is zero (No in S107 in FIG. 5), and the control proceeds to step S108, where the failure detection counter is incremented (+1).

Then, the shift speed retaining portion 55 retains the current condition in which the shift speed different from the selected shift speed has been established. That is the shift speed, at which the friction engagement element that cannot be disengaged is engaged, is retained (S109 in FIG. 5). Then, the shift speed releasing portion 57 retains temporarily this shift speed until a predetermined condition for releasing the retained shift speed is satisfied (No in S110 in FIG. 5). If the condition is satisfied (Yes in S110 in FIG. 5), the shift speed releasing portion 57 releases the retained shift speed (S111 in FIG. 5).

The condition for releasing the retained shift speed is one of the following three conditions: (a) a predetermined time Ta has passed since the shift speed retaining portion 55 started retaining the shift speed different from the selected shift speed; (b) the shift speed selected by the shift speed selecting portion 52 matches the retained shift speed; and (c) the vehicle speed becomes zero (that is, the vehicle is stopped).

The condition (a) is provided in order to retain the shift speed for the predetermined time Ta so that the friction engagement element disengaged by the disengagement control portion 56 (that is, the frictionally slipping clutch or brake) is sufficiently cooled, and burning of the friction engagement element or the like is prevented. In other words, the condition (a) is provided in order to inhibit the subsequent shifting to prevent the disengaged friction engagement element from being quickly reengaged.

The condition (b) is such that the retained shift speed matches the shift speed selected by the shift speed selecting portion 52. Thus, under the condition (b), the shift control has returned to normal automatic shift control, and there is no possibility that the disengaged friction engagement element is quickly reengaged.

The condition (c) is such that the vehicle is stopped, and the rotational speed of the output shaft is zero. Thus, under the condition (c), rotation of automatic speed change mechanism 5 is stopped, and the automatic transmission 3 does not rotate even if the disengaged friction engagement element is reengaged. That is, no frictional slipping occurs under the condition (c).

Thus, the shift speed releasing portion 57 releases the shift speed retained by the shift speed retaining portion 55, if the condition that the friction engagement element disengaged by the disengagement control portion 56 can be protected is satisfied (S111 in FIG. 5). Then, the control returns to step S103.

Then, the failure detecting portion 53 detects a failure (S103 in FIG. 5), the control proceeds similarly, and the counter portion 66 increments the failure detection counter (S108 in FIG. 5). The shift speed retaining portion 55 retains the shift speed (S109 in FIG. 5), and the shift speed releasing portion 57 releases the retained shift speed (S111 in FIG. 5). After repeating such control a predetermined number of times, In step S107, the counter portion 66 determines that the failure detection counter is equal to or larger than the predetermined threshold value (i.e., the predetermined value). The emergency control portion 65 starts emergency control (i.e., an emergency mode) according to the determination of the counter portion 66 (S112 in FIG. 5).

Note that the ignition switch IG can be turned off before the counter portion 66 determines that the failure detection counter is equal to or larger than the predetermined threshold value (the predetermined value). In other words, the ignition switch IG can be turned off after the failure detection has occurred several times, but less than a predetermined number of times. In this case, as described above, the failure detection counter is cleared when the ignition switch IG is turned on (that is, the failure detection counter is cleared when an ignition switch ON signal is input to the control apparatus 1 for the automatic transmission) (S102 in FIG. 5). Thus, the operation mode is not immediately switched to the emergency mode unless the failure detection occurs the predetermined number of times. Thus, if a failure is detected by the failure detection portion 53 due to temporary malfunction, the shift control can subsequently return to normal shift control.

On the other hand, if the emergency mode is started, the emergency control portion 65 performs an operation similar to the operation of retaining the shift speed by the shift speed retaining portion 55, based on the state of the failure detected by the failure detecting portion 53, that is, based on which of the friction engagement elements is slipping, and which of the friction engagement elements cannot be disengaged. Thus, the emergency control portion 65 disengages the slipping friction engagement element, and retains the shift speed at which the friction engagement element that cannot be disengaged is engaged (S113 in FIG. 5).

The emergency control portion 65 continues to retain the shift speed until the vehicle speed becomes equal to or lower than a predetermined value Va (No in S114 in FIG. 5). If the vehicle speed becomes equal to or lower than the predetermined value Va (Yes in S114 in FIG. 5), the emergency control portion 65 releases the retained shift speed, selects a lower shift speed capable of starting the vehicle, from the shift speeds using the friction engagement element that cannot be disengaged (that is, from the possible shift speeds), and sends a shift command to the lower shift speed (S115 in FIG. 5), and retains the lower shift speed until the ignition switch IG is turned off and the emergency mode is terminated (S116 in FIG. 5). Thus, the vehicle can be restarted during the emergency mode, and the minimum limp home function can be ensured.

Control Example of Control Apparatus for Automatic Transmission

An example of the control of the control apparatus 1 for the automatic transmission will be described below with reference to the timing charts of FIGS. 6 and 7. For example, if the shift speed selecting portion 52 selects the fifth forward speed at time t1 during traveling at the fourth forward speed, the oil pressure command control portion 51 sends a 4-5 upshift command. In this case, an oil pressure command for the engagement pressure PC1 of the clutch C-1 is a command to gradually reduce the engagement pressure PC1 as shown by dashed line in FIG. 6 so as to disengage the clutch C-1. An oil pressure command for the engagement pressure PC3 of the clutch C-3 is a command to gradually increase the engagement pressure PC3 as shown by solid line in FIG. 6 so as to engage the clutch C-3. An oil pressure command for the engagement pressure PC2 of the clutch C-2 is a command to maintain the engagement pressure PC2 as shown by solid line in FIG. 6 so as to keep the clutch C-2 engaged.

Figure 6:
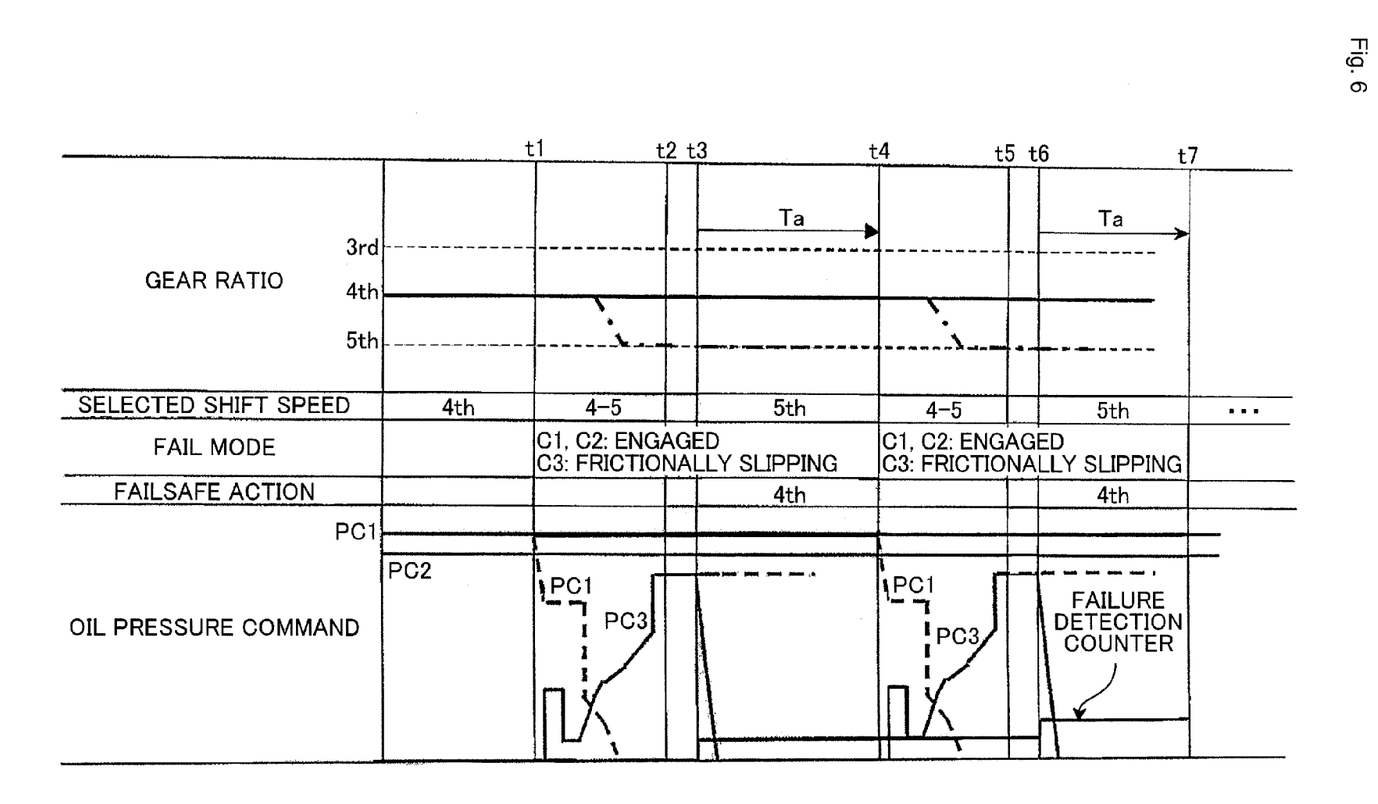
FIG. 6 is a timing chart showing the shift speed retaining control according to the embodiment of the present invention.

For example, if the linear solenoid valve SLC1 fails in an ON state (e.g., due to a valve stick), the engagement pressure PC1 actually does not decrease, and continues to be output as shown by solid line in FIG. 6. Thus, the clutch C-1 cannot be disengaged, and thus is kept engaged. On the other hand, the engagement pressure PC3 of the clutch C-3 increases so as to engage the clutch C-3. Thus, the clutches C-1, C-2, C-3 attempt to be engaged simultaneously. In this case, due to a change in torque sharing, the clutch C-3 slips, and the clutches C-1, C-2 are kept engaged. In such a fail mode, the shift speed is not shifted to the selected fifth forward speed as shown by chain line in FIG. 6, and the shift control is terminated at time t2 at the forth forward speed (i.e., a shift speed different from the selected shift speed).

At time t3 after the shift operation, the failure detecting portion 53 detects the failure state (S103 in FIG. 5), and the disengagement control portion 56 starts a control operation of disengaging the slipping (frictionally slipping) clutch C-3 (S104 in FIG. 5). Thus, as shown by dashed line in FIG. 6, the clutch C-3 is immediately disengaged without frictionally slipping any more. This suppresses heat generation, and protects a friction material. At time t3, the over-revolution determining portion 61 determines if over-revolution will occur (S105 in FIG. 5). Since no over-revolution will occur (No in S105 in FIG. 5), the counter portion 66 determines if the failure detection counter is equal to or larger than the predetermined threshold value (S107 in FIG. 5). Since the failure detection counter is not equal to or larger than the predetermined threshold value (No in S107 in FIG. 5), the counter portion 66 increments the failure detection counter (+1) (S108 in FIG. 5). The shift speed retaining portion 55 retains the current condition in which the fourth forward speed, which is different from the selected fifth forward speed, is established (S109 in FIG. 5). At time t3, the shift speed releasing portion 57 starts measuring the predetermined time Ta.

Once the fourth forward speed is retained by the shift speed retaining portion 55, the shift speed releasing portion 57 does not release the fourth forward speed until one of the above conditions (a) to (c) is satisfied. Thus, although the selected shift speed is the fifth forward speed, the fourth forward speed is retained until time t4 (that is, a failsafe action is performed until time t4). In this example, the predetermined time Ta elapses at time t4. That is, the condition (a) is satisfied at time t4. Thus, the shift speed releasing portion 57 releases the retained fourth forward speed at time t4 (Yes in S110, and S111 in FIG. 5).

Thus, at time t4, the fourth forward speed is released, and the selected shift speed is the fifth forward speed. Accordingly, the oil pressure command control portion 51 sends a 4-5 upshift command again at time t4. For example, if the linear solenoid valve SLC1 fails in an ON state as in the failure described above, the clutches C-1, C-2, C-3 attempt to be engaged simultaneously as described above, whereby the clutch C-3 slips, and the clutches C-1, C-2 are kept engaged. In this fail mode, the shift speed is not shifted to the selected fifth forward speed, and the shift control is terminated at time t5 at the forth forward speed.

Similarly, at time t6 after the shift operation, the failure detecting portion 53 detects the failure state (S103 in FIG. 5), and the disengagement control portion 56 starts a control operation of disengaging the slipping (frictionally slipping) clutch C-3 (S104 in FIG. 5). At time t6, the over-revolution determining portion 61 determines if over-revolution will occur (S105 in FIG. 5). Since no over-revolution will occur (No in S105 in FIG. 5), the counter portion 66 determines if the failure detection counter is equal to or larger than the predetermined threshold value (S107 in FIG. 5). Since the failure detection counter is not equal to or larger than the predetermined threshold value (No in S107 in FIG. 5), the counter portion 66 increments the failure detection counter (+1) (S108 in FIG. 5). The shift speed retaining portion 55 retains the current condition in which the fourth forward speed, which is different from the selected fifth forward speed, is established (S109 in FIG. 5).

The shift speed retaining portion 55 retains the fourth forward speed until time t7. The predetermined time Ta elapses at time t7. That is, the condition (a) is satisfied at time t7. Thus, the shift speed releasing portion 57 releases the retained fourth forward speed at time t7 (Yes in S110, and S111 in FIG. 5).

Figure 7:
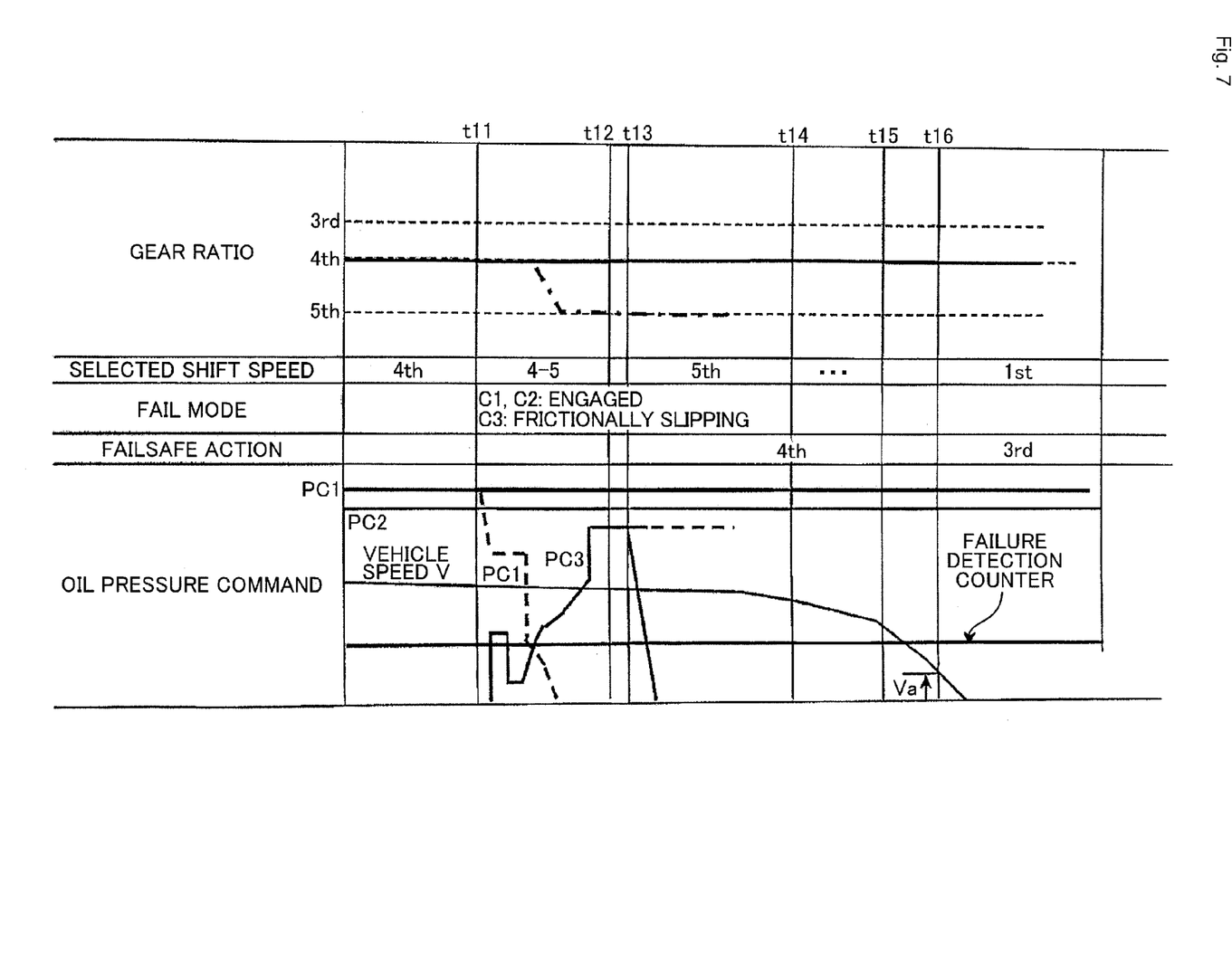
FIG. 7 is a timing chart showing the emergency control according to the embodiment of the present invention.

If the above steps of sending a shift command from the fourth forward speed to the fifth forward speed, detecting a failure state, incrementing the failure detection counter, retaining the fourth forward speed, and releasing the retained fourth forward speed (S103 to S111 in FIG. 5) are repeated a predetermined number of times, the failure detection counter becomes equal to or larger than the predetermined threshold value (that is, the predetermined value), as shown in FIG. 7. In this state, if the oil pressure command control portion 51 sends a 4-5 upshift command again at time t11, and the linear solenoid valve SLC1, for example, fails in an ON state as in the failure described above, the clutches C-1, C-2, C-3 attempt to be engaged simultaneously as described above, whereby the clutch C-3 slips, and the clutches C-1, C-2 are kept engaged. In this fail mode, the shift speed is not shifted to the fifth forward speed, and the shift control is terminated at time t12 at the forth forward speed.

At time t13 after the shift operation, the failure detecting portion 53 detects the failure state (S103 in FIG. 5), and the disengagement control portion 56 starts a control operation of disengaging the slipping clutch C-3 (S104 in FIG. 5). The over-revolution determining portion 61 determines if over-revolution will occur (S105 in FIG. 5). Since no over-revolution will occur (No in S105 in FIG. 5), the counter portion 66 determines if the failure detection counter is equal to or larger than the predetermined threshold value (S107 in FIG. 5). In the state of FIG. 7, the failure detection counter is equal to or larger than the predetermined threshold value (Yes in S107 in FIG. 5). Thus, the emergency control portion 65 starts the emergency mode according to the determination of the counter portion 66 to permanently retain the fourth forward speed until the vehicle speed V reduces (that is, the emergency control portion 65 retains the fourth forward speed "4TH" as a failsafe action) (S113 in FIG. 5).

Even if the shift speed selecting portion 52 determines to perform a downshift based on the vehicle speed V and the like (i.e., the traveling condition) at, e.g., time t14 or time t15, and changes the selected shift speed, the emergency control portion 65 continue to retain the fourth forward speed as a failsafe action.

If the vehicle speed V detected by the output shaft rotational speed sensor 82 becomes equal to or lower than the predetermined value Va at time t16 (Yes in S114 in FIG. 5), the emergency control portion 65 sends a shift command to the third forward speed even if the shift speed selected by the shift speed selecting portion 52 is, e.g., the first forward speed (S115 in FIG. 5), and retains the third forward speed until the ignition switch IG is turned off and the emergency mode is terminated and then terminates the emergency mode. The third forward speed is a shift speed that can be established (i.e., can be established even if the cutch C-1 is in an engaged state), and also can restart the vehicle. The emergency control portion 65 operates in this manner in order to give priority to safety or to prevention of sudden starting of the vehicle. Thus, the vehicle can be restarted at time t14 or later when the driver attempts to restart the vehicle, whereby the minimum limp home function is obtained.

Conclusions about Control Apparatus For Automatic Transmission

As described above, according to the control apparatus 1 for the automatic transmission of the present invention, in the event of a failure in which a friction engagement element that is supposed to be disengaged (the clutch C-1 in the above example) is engaged, one of the friction engagement elements (the clutch C-3 in the above example) slips, whereby one of the shift speeds (the fourth forward speed in the above example) is established. When the failure is detected by the failure detecting portion 53, the shift stage retaining portion 55 disengages the slipping friction engagement element (the clutch C-3 in the above example), and temporarily retains the shift speed (the fourth forward speed in the above example) different from the selected shift speed (the fifth forward speed in the above example). This can prevent the slipping friction engagement element (the clutch C-3 in the above example) from frictionally slipping for a long time, and thus can protect this friction engagement element.

The shift speed releasing portion 57 releases the shift speed retained by the shift speed retaining portion 55, based on the predetermined condition. Thus, even if the shift speed is retained by the shift speed retaining portion 55 due to temporary malfunction, the shift speed releasing portion 57 can release the retained shift speed to attempt the shift operation again. That is, if a failure is detected by the failure detecting portion 53 due to temporary malfunction, the shift control can be switched from the fail mode back to normal shift control.

If the predetermined condition for releasing the shift speed retained by the shift speed retaining portion 55 is that the predetermined time Ta has passed, the friction engagement element having generated heat due to slipping (the clutch C-3 in the above example) can be sufficiently cooled, and can be protected.

If the predetermined condition for releasing the shift speed retained by the shift speed retaining portion 55 is that the shift speed selected by the shift speed selecting portion 52 matches the retained shift speed, the shift control returns to the normal shift control. Thus, there is no possibility that the friction engagement element having generated heat due to slipping is quickly reengaged, whereby this friction engagement element can be protected.

If the predetermined condition for releasing the shift speed retained by the shift speed retaining portion 55 is that stopping of the vehicle is detected, the friction engagement element having generated heat due to slipping does not rotate even if it is reengaged. Thus, this friction engagement element does not frictionally slip, whereby this friction engagement element can be protected.

The counter portion 66 increments the failure detection counter every time the shift speed retaining portion 55 retains the shift speed (the fourth forward speed in the above example) different from the selected shift speed (the fifth forward speed in the above example). When the failure detection counter reaches the predetermined threshold value, the emergency control portion 65 switches the shift control to the emergency mode for performing the failsafe control. Thus, the operation state can be switched to a failsafe state in the event of a permanent failure state that is not temporary malfunction.

The emergency mode is a mode in which the slipping friction engagement element (the clutch C-3 in the above example) is disengaged, and the shift speed (the fourth forward speed in the above example) different from the selected shift speed (the fifth forward speed in the above example) is retained until the vehicle speed V becomes equal to or lower than the predetermined value Va. This can reliably prevent a stalled state resulting from engagement of the friction engagement element that is supposed to be disengaged (the clutch C-1 in the above example). For example, when the vehicle speed V becomes equal to or lower than the predetermined value Va, the automatic transmission is shifted to a lower shift speed that can be established and can start the vehicle (the third forward speed in the above example). Thus, the vehicle can be restarted even in the emergency mode.

If the over-revolution determining portion 61 determines that over-revolution of the engine 2 will occur, when the shift speed retaining portion 55 retains the shift speed (the fourth forward speed in the above example) different from the selected shift speed (the fifth forward speed in the above example), the over-revolution avoiding portion 60 controls the linear solenoid valves SLC1, SLC2, SLC3, SLB1 to shift the automatic transmission 3 into a neutral state. This can prevent over-revolution of the engine 2, and thus can protect the engine 2.

Note that, in the embodiment described above, the control apparatus 1 is applied to the automatic transmission 3 that attains six forward speeds and a reverse speed. However, the present invention is not limited to this, and the present invention is applicable also to automatic transmissions that attain, e.g., eight forward speed and a reverse speed. That is, the structure of the automatic transmission is not limited as long as the engagement pressures of the hydraulic servos in a normal operation are determined so that one of the friction engagement elements slips and thus one of the shift speeds is established in the event of a failure in which a friction engagement element, which is supposed to be disengaged in a normal operation, is engaged.

In the above embodiment, the shift speed releasing portion 57 releases the retained shift speed if one of the three conditions (a) to (c) is satisfied. However, the conditions are not limited to these conditions, and may be any conditions as long as the frictionally slipping friction engagement element can be protected even if the retained shift speed is released.

The failure state described as an example in the above embodiment is a state in which the clutch C-1 cannot be disengaged when a shift command from the fourth forward speed to the fifth forward speed is output. However, the present invention is not limited to this. It should be understood that the present invention is applicable regardless of which shift speed is a current shift speed, and regardless of which friction engagement element cannot be disengaged.

The hydraulic control apparatus for the automatic transmission of the present invention can be used for control apparatuses for automatic transmissions that are mounted on passenger cars, trucks, and the like. The hydraulic control apparatus for the automatic transmission of the present invention is preferably used for control apparatuses for automatic transmissions, in which in the event of a failure in which a friction engagement element that is supposed to be disengaged in a normal operation is engaged, one of the friction engagement elements slips and thus one of the shift speeds is established, and the slipping friction engagement element need be protected.

The invention claimed is:

1. A control apparatus for an automatic transmission, for controlling a plurality of pressure regulating solenoid valves for regulating and controlling an engagement pressure to be supplied to or removed from each hydraulic servo of a plurality of friction engagement elements, and for determining the engagement pressure to be supplied to or removed from the each hydraulic servo in a normal operation so that none of the friction engagement elements slips at each shift speed in the normal operation, and so that in case of a failure in which the friction engagement element that is supposed to be disengaged in the normal operation is engaged, one of the friction engagement elements slips, and thus one of the shift speeds is established, the control apparatus characterized by comprising:

a failure detecting portion that detects the failure when a gear ratio after a shift operation is a gear ratio of a shift speed different from a shift speed to be established; and a shift speed retaining portion that disengages the slipping friction engagement element, and retaining the shift speed that is different from the shift speed to be established, when the failure detecting portion detects the failure.

2. The control apparatus according to claim 1, further comprising:
a shift speed releasing portion that releases the shift speed retained by the shift speed retaining portion, based on a predetermined condition.

3. The control apparatus according to claim 2, wherein the predetermined condition is that a predetermined time has passed.

4. The control apparatus according to claim 3, wherein the predetermined condition is that a predetermined time has passed since the shift speed retaining portion started retaining the shift speed.

5. The control apparatus according to claim 2, further comprising:
a shift speed selecting portion that selects as needed a shift speed to be established in the normal operation, based on a traveling condition, wherein
the predetermined condition is that the shift speed selected by the shift speed selecting portion matches the retained shift speed.

6. The control apparatus according to claim 2, wherein the predetermined condition is that stopping of a vehicle is detected.

7. The control apparatus according to claim 2, further comprising:
a counter portion that increments a counter every time the shift speed retaining portion retains the shift speed that is different from the shift speed to be established; and
an emergency control portion that switches a control operation of the control apparatus to an emergency mode for performing failsafe control, when the counter counted by the counter portion reaches a predetermined value.

8. The control apparatus according to claim 7, wherein the counter is cleared when an ignition switch ON signal is input to the control apparatus.

9. The control apparatus according to claim 7, wherein the emergency mode is a mode in which the shift speed different from the shift speed to be established is retained until a vehicle speed becomes equal to or lower than a predetermined value.

10. The control apparatus according to claim 9, wherein in the emergency mode, the automatic transmission is shifted to a lower shift speed that can be established and can start the vehicle, when the vehicle speed is equal to or lower than the predetermined value.

11. The control apparatus according to claim 1, further comprising:
an over-revolution determining portion that determines if over-revolution of a drive source will occur or not, when the shift speed retaining portion retains the shift speed different from the shift speed to be established; and
an over-revolution avoiding portion that controls the plurality of pressure regulating solenoid valves to shift the automatic transmission to a neutral state, when the over-revolution determining portion determines that the over-revolution of the drive source will occur.

12. A method for controlling an automatic transmission, in which
a plurality of pressure regulating solenoid valves for regulating and controlling an engagement pressure to be supplied to or removed from each hydraulic servo of a plurality of friction engagement elements are controlled, and
the engagement pressure to be supplied to or removed from the each hydraulic servo in a normal operation is determined so that none of the friction engagement elements slips at each shift speed in the normal operation, and so that in case of a failure in which the friction engagement element that is supposed to be disengaged in the normal operation is engaged, one of the friction engagement elements slips, and thus one of the shift speeds is established, the method characterized by comprising:
detecting the failure when a gear ratio after a shift operation is a gear ratio of a shift speed different from a shift speed to be established; and
disengaging the slipping friction engagement element, and retaining the shift speed different from the shift speed to be established, when the failure is detected.

\* \* \* \* \*